(12) United States Patent
Christian (10) Patent No.: US 8,868,375 B1
(45) Date of Patent: Oct. 21, 2014

(54) GENERATION OF A FLOOR PLAN (71) Applicant: Locometric Ltd., Stockport (GB)

(72) Inventor: Max Christian, Stockport (GB)

(73) Assignee: Locometric Ltd, Stockport (GB)

( * ) Notice: Subject to any disclaimer, the term of this patent is extended or adjusted under 35 U.S.C. 154(b) by 0 days.

(21) Appl. No.: 14/284,083

(22) Filed: May 21, 2014

(51) Int. Cl.
*G01B 21/20* (2006.01)
*G01C 1/00* (2006.01)
*G01B 11/00* (2006.01)
*G01C 21/32* (2006.01)

(52) U.S. Cl.
CPC ...................................... *G01C 21/32* (2013.01)
USPC .............................. 702/155; 33/228; 702/156

(58) Field of Classification Search
CPC ........... G01B 21/20; G01B 11/00; G01C 1/00
USPC .................... 702/155, 156; 33/280
See application file for complete search history.

(56) References Cited

FOREIGN PATENT DOCUMENTS

GB 2498177 A 7/2013

OTHER PUBLICATIONS

MagicPlan, "Make 3D floorplans with your phone," available at http://en.floorplanner.com/magicplan, downloaded May 17, 2014, 4 pages.
Subspace—Measure Rooms, available at http://download.cnet.com/Subspace-Measure-rooms/3000-2094_4-75918001.html, downloaded May 17, 2014, 5 pages.
Max Christian, "Just Tap Your Phone on Each Wall and This App Will Draw a Floor Plan," available at http://locometric.com/press/release-march-2014.pdf, Mar. 22, 2014, downloaded May 21, 2014, 1 page.

*Primary Examiner* — Fadey Jabr
*Assistant Examiner* — Yazan A Soofi
(74) *Attorney, Agent, or Firm* — DiBerardino McGovern IP Group LLC

(57) ABSTRACT

Data, including a plurality of spatial positions of a device that moves through the space, at least some of the positions being positions along the boundary, is accessed; a physical measurement of a region at the boundary is accessed; a determined measurement of the region at the boundary, the determined measurement being based on a subset of the plurality of spatial positions; comparing the physical measurement and the determined measurement, is accessed; a correction based on the comparison is determined; the correction is applied to at least some of the plurality of spatial positions to generate corrected spatial positions; a diagram of the space based on the corrected spatial positions is generated; and the diagram of the space is presented.

20 Claims, 7 Drawing Sheets

GENERATION OF A FLOOR PLAN

TECHNICAL FIELD

This disclosure relates to generation of a floor plan.

BACKGROUND

In the construction and/or remodeling of a building or other structure, a common requirement is the generation of a floor plan that represents a layout and dimension of the building or other structure.

SUMMARY

In one general aspect, a computer-implemented method for generating a diagram of a space that is at least partially enclosed by a physical boundary includes accessing data including a plurality of spatial positions of a device that moves through the space, at least some of the positions being positions along the boundary; accessing a physical measurement of a region at the boundary; accessing a determined measurement of the region at the boundary, the determined measurement being based on a subset of the plurality of spatial positions; comparing the physical measurement and the determined measurement; determining a correction based on the comparison; applying the correction to at least some of the plurality of spatial positions to generate corrected spatial positions; generating a diagram of the space based on the corrected spatial positions; and presenting the diagram of the space.

Implementations can include one or more of the following features. The correction can be applied to spatial positions measured after the subset of the plurality of spatial positions. The data can include data that describes a measured motion of the movable device in the space. Each of the plurality of spatial locations can represent a location of the movable device in at least two dimensions. Each of the plurality of spatial locations can be measured by the movable device at a different time.

The boundary can include walls, the space can be a space that is at least partially enclosed by the walls, and the diagram can be a floor plan. Accessing a physical measurement of a region at the boundary can include receiving a measurement of a physical distance of a portion of the boundary. Receiving a measurement of the physical distance of a portion of the boundary can include receiving a measurement of a wall that forms part of the boundary. Presenting the corrected diagram can include visually presenting the corrected diagram on the movable device. Each of the plurality of locations can be a location of the movable device when the movable device is stationary. Each of the plurality of locations can include an orientation of the mobile device. The space can be a room, the boundary can include walls that at least partially enclose the room and meet at corners, and the method can also include determining a location of the corners. Accessing a determined measurement of the region at the boundary can include determining a distance between the determined locations of two of the corners in one dimension. Accessing a physical measurement of a region at the boundary can include accessing a plurality of physical measurements, each of a different region at the boundary. At least two of the plurality of physical measurements can be taken along directions that are orthogonal to each other.

In another general aspect, a movable device for generating a diagram of a space that is at least partially enclosed by a physical boundary includes a housing configured to be carried by a user; a motion sensor; and one or more electronic processors and a non-transitory computer-readable medium including instructions that, when executed, cause the one or more electronic processors to: access data including a plurality of spatial positions of a device that moves through the space, at least some of the positions being positions along the boundary; access a physical measurement of a region at the boundary; access a determined measurement of the region at the boundary, the determined measurement being based on a subset of the plurality of spatial positions; compare the physical measurement and the determined measurement; determine a correction based on the comparison; apply the correction to at least some of the plurality of spatial positions to generate corrected spatial positions; generate a diagram of the space based on the corrected spatial positions; and present the diagram of the space.

Implementations can include one or more of the following features. The instructions to cause the one or more processors to access the physical measurement can include instructions to cause the one or more processors to present an graphical interface to the user, the graphical interface configured to allow the user to enter the physical measurement. The device can include a measurement sensor, and the instructions to access the physical measurement can include instructions to access a measurement obtained by the measurement sensor. The measurement sensor can measure a length of a portion of the boundary without user intervention. The measurement sensor can include a laser measure.

Implementations of any of the techniques described above may include a process, method, a device, and apparatus, or instructions for correcting position data that is used to generate a diagram of a space and are stored on a non-transitory computer-readable medium.

The details of one or more implementations are set forth in the accompanying drawings and the description below. Other features will be apparent from the description and drawings, and from the claims.

DETAILED DESCRIPTION

Techniques for enhancing the accuracy of a diagram of a space (such as a floor plan) are disclosed. The techniques do not require editing of an existing floor plan. Instead, position data from which the floor plan is generated are corrected to account for inaccuracies in measured motion of a device that records positions in the space.

A floor plan of a room can be created from motion sensor data recorded by a mobile device (such as a smart phone, for example, an iPhone or iPod Touch available from Apple Computer Corporation of Cupertino, Calif.) as the mobile device is touched against each of the room's walls. The motion of the mobile device is reconstructed based on the motion sensor data using a technique called inertial navigation. The reconstructed motion of the mobile device is then used to deduce the position and orientation of each of the walls that were touched, and thus the coordinates at which the walls meet (the corners). From the coordinates of the corners, the length of each wall can be calculated and a floor plan of the room produced.

Due to the limited accuracy of the motion sensor in the mobile device and the inherent sensitivity to sensor error of the algorithms used to reconstruct the motion of the mobile device, it is not always possible to reconstruct the motion of the device accurately. This can result in incorrect measurements on the generated floor plan, such as incorrect calculations of the wall lengths.

The technique discussed below uses a more accurate figure for a measurement of part or all of a wall, perhaps from a tape measure or a laser measure, to improve the accuracy of the generated floor plan. In some implementations, the generated floor plan is displayed on the mobile device in an interactive interface and users can tap a wall on the floor plan and enter their own measurements for a wall or walls. When a user has manually input one or more measurements (just one will do), the correction technique adjusts all the other measurements to fit with those that have been entered manually. The adjusted measurements can be significantly more accurate than before the adjustment.

The correction technique does not work by scaling the whole floor plan up or down according to the difference between the measurements based on the reconstructed motion of the mobile device and the user's input. For example, if a determined measurement for a given wall was 100 centimeters (cm) and the user input a length of 110 cm for that wall, scaling the whole floor plan up by 10% in each dimension would result in a plan that matched that single input. However, because the errors can be different in various dimensions, such an approach may not give good results. Instead, and as discussed below, the correction technique works by remembering every movement the user made around the room, and re-imagining that movement taking into account knowledge of the lengths the user entered manually.

Figure 1A:
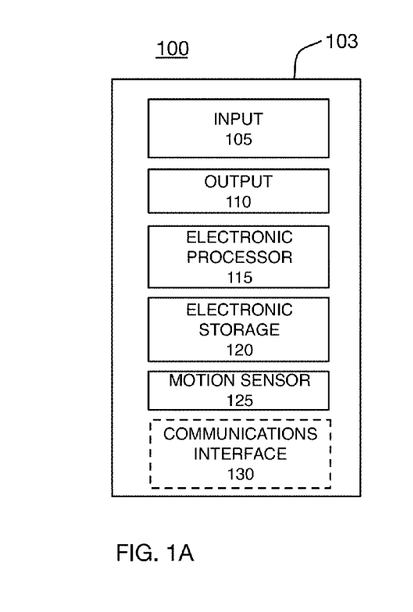
FIG. 1A is a block diagram of an exemplary device for generating a diagram of a space that is at least partially enclosed by a physical boundary.
Figure 1B:
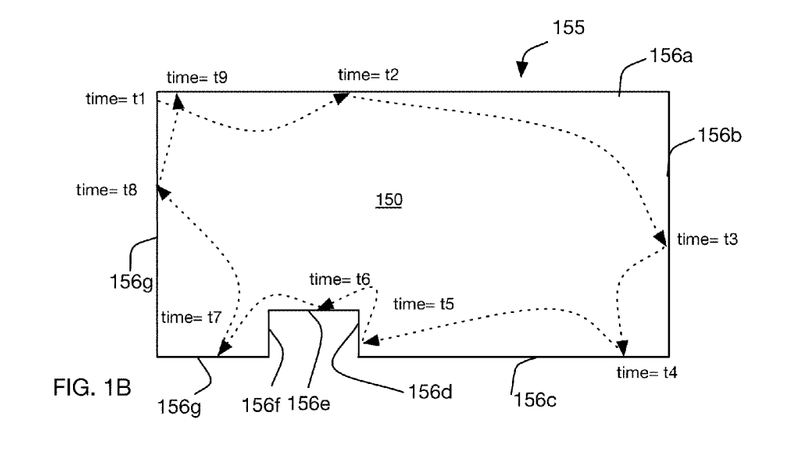
FIG. 1B is an exemplary space enclosed by a physical boundary.
Figure 1C:
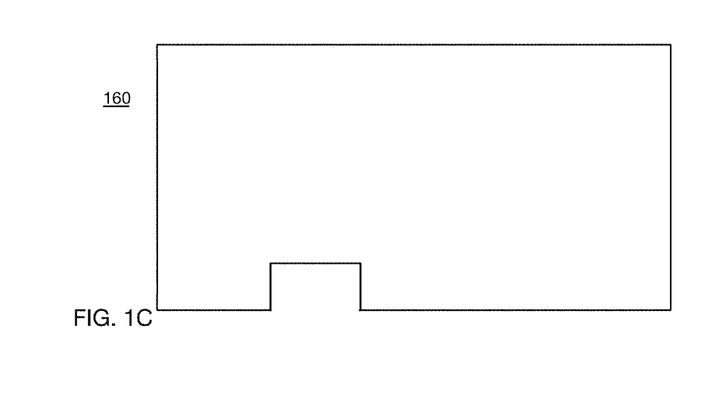
FIG. 1C is an exemplary diagram of the boundary of the space of FIG. 1B.

Referring to FIG. 1A, a block diagram of an exemplary device 100 is shown. Referring also to FIG. 1B, an exemplary space 150 is shown. FIG. 1C shows an exemplary diagram 160 of the space 150 generated from motion and/or position data measured by the device 100. The device 100 moves through the space 150, measuring the position and orientation of walls 156a-156g at times t1-t9, and estimates the motion of the device 100. The position and orientation of the walls 156a-156g can be measured from a collection of spatial points that correspond to locations along the walls 156a-156g. For example, the spatial points can be a point where the device 100 is stationary and held to the wall (a "wall touch"). Each wall touch establishes a point on the wall (the point where the device 100 stopped) and the orientation of the wall (and angle of the device 100 when it stopped). Each wall 156a-156h can be touched one or more times by the device 100. In the example where there is exactly one touch per wall 156a-156h, this gives a set of infinite (unbounded) lines, each successive pair of which intersect. These points of intersection provide estimates of the corners of the room, and each pair of corners gives the coordinates of the start and end of one wall. A wall touch can be initiated by a user interaction with the device 100 or automatically and without user interaction.

The estimated motion of the device 100 is used to generate the diagram 160 of the space 150. As discussed in greater detail with respect to FIGS. 2A, 2B and 3, errors in the estimated motion of the device 100 can cause errors in the diagram 160. Such errors can be reduced or eliminated by incorporating a separate measurement of a portion of the boundary and using the separate measurement to adjust the estimated motion. Prior to discussing this correction, an overview of the device 100 is provided.

The device 100 is a movable device that can be held and moved by a human operator, perhaps in a single hand of the operator. The device 100 can be, for example, a tablet or a smart phone. A smart phone is a mobile phone capable of connecting to the Internet or the cellular telephone network. The device 100 includes a housing 103, an input 105, an output 110, an electronic processor 115, an electronic storage 120, a motion sensor 125, and a communications interface 130. The input 105 allows the operator to input data into the device 100, and the output 110 allows data to be presented or displayed at the device 100. The output 110 can include, for example, a visual display or a speaker that produces an audible signal. Collectively, the input 105 and the output 110 can be any type of input/output interface that allows a human operator or an automated process to communicate with the device 100 or its components.

The electronic storage 120 may be volatile memory, such as RAM, or non-volatile memory. In some implementations, and the electronic storage 120 may include both non-volatile and volatile portions or components. The electronic processor 115 may be one or more processors suitable for the execution of a computer program such as a general or special purpose microprocessor, and any one or more processors of any kind of digital computer. Generally, a processor receives instructions and data from a read-only memory or a random access memory or both.

The electronic processor 115 can be any type of electronic processor and can be more than one electronic processor. The electronic storage 120 stores instructions, perhaps as a computer program, that, when executed, cause the processor 115 to communicate with other components in the device. For example, the instructions can be instructions to cause the electronic storage 120 to store outputs from the motion sensor 125. The instructions can be instructions that cause the electronic processor 115 to display the diagram 160 at the output 110 and to accept input from the user in response to the user tapping on a portion of the diagram 160. Additionally, the electronic storage 120 can store data, such as a digital representation of the diagram 160.

The motion sensor 125 can be an inertial measurement unit that includes rotation sensors (such as gyroscopes) and linear motion sensors (such as accelerometers). The inertial measurement unit can include three gyroscopes and three accelerometers. The inertial measurement unit tracks the relative spatial position of the device 100, continuously calculating, using dead reckoning, the position, orientation, and velocity (direction and speed) of the device 100. In this manner, the motion sensor 125 can also be considered a position sensor. Dead reckoning is a technique in which the current position of the device 100 is calculated based on a previously determined position and advancing that position based on estimated velocity. The inertial measurement unit may track the spatial position of the device 100 from an initial starting point or from a user-inputted starting position. The inertial measurement unit can be configured to track the spatial position of the device 100 in four degrees of freedom. The four degrees of freedom can include translational displacement in a first direction, translational displacement in a second direction orthogonal to the first direction, angular displacement about a first axis of rotation, and angular rotation about a second axis of rotation that is orthogonal to the first axis. In some implementations, more degrees of freedom can be used.

The inertial measurement unit can include an additional electronic processor adapted to process the outputs of the gyroscopes and accelerometers for tracking the spatial position of the device 100. However, the electronic processor 115 can process the outputs of the gyroscopes and accelerometers such that an additional electronic processor in the inertial measurement unit is not included.

The device 100 also may include a communications interface 130 through which the device 100 sends and receives data. The communications interface 130 can be, for example, a cellular interface that allows the device 100 to communicate with other devices via a cellular telephone network or the Internet. The communications interface 130 can be an interface that accepts a cable or wire through which data can pass, allowing the device 100 to communicate through a wired connection. The communications interface 130 can be any wired or wireless interface.

Figure 2A:
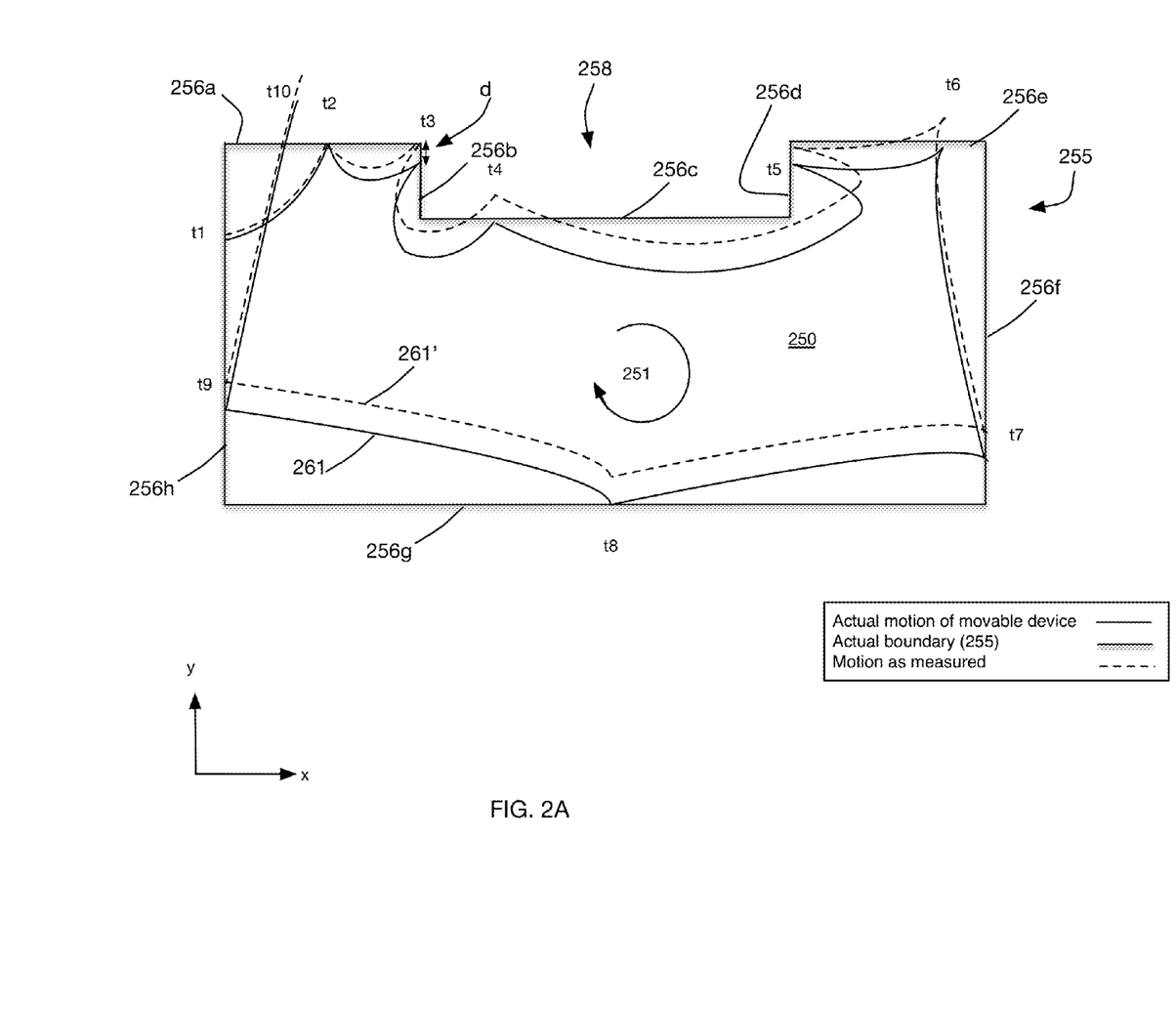
FIG. 2A is a schematic of exemplary modeled actual and measured paths of a device that moves in a space.
Figure 2B:
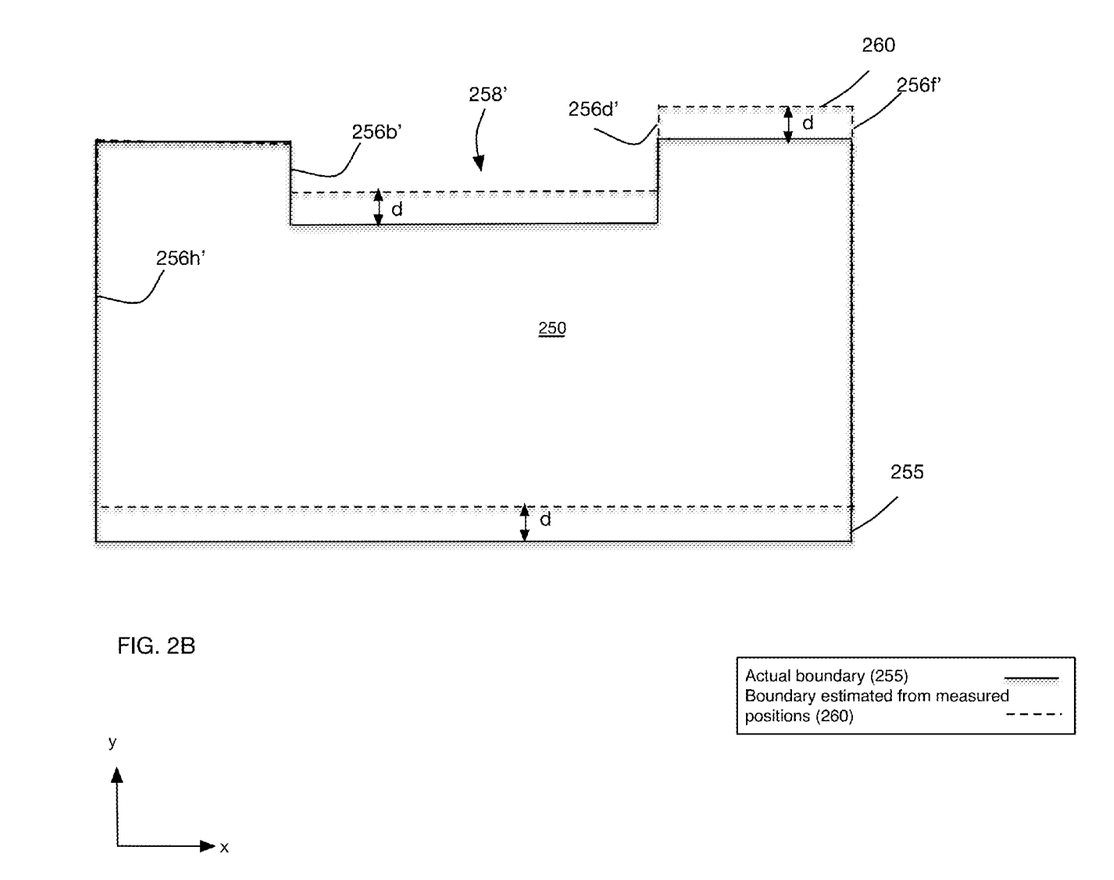
FIG. 2B is a schematic of an actual boundary of a space and a boundary estimated from measured positions.

Referring to FIGS. 2A and 2B, a schematic of a space 250 enclosed by a boundary 255 is shown. FIG. 2A shows a path 261, which is the actual path of the device 100 that is carried along by the user, and a path 261', which is a path of the device 100 that is reconstructed or estimated from position data collected by the device 100. Due to inaccuracies in estimating the motion of the device 100, the paths 261 and 261' are not identical.

FIG. 2B shows an exemplary diagram 260 of the space 250 and the boundary 255 based on the position data measured by the device 100. The diagram 260 represents the estimate of the boundary 255 that is derived from data measured by the device 100 prior to correction. Because of the discrepancy between the actual motion of the device 100 and the measured or estimated motion of the device, the diagram 260 does not overlap with the boundary 255. In other words, the diagram 260 has inaccuracies due to inaccuracies in the measured motion of the device 100.

In the example of FIG. 2A, the boundary 255 is a collection of walls 256a-256h that meet at corners. A chimneybreast 258 is formed from the walls 256b-256d. A user carries the device 100 through the space 250 in a clockwise direction 251 along the path 261, which is the actual motion of the device 100. The position data from the motion sensor 125 is used to reconstruct the motion of the device 100. The reconstructed or estimated motion of the device 100 is the path 261'. The device 100 moves through the space 250 along the path 261 over a time period t1-t10. At each of the times t1-t10, the device 100 is motionless and is touched against a portion of the boundary 255. The device 100 records the position and orientation of the boundary 255 at each time t1-t10. The device 100 can record the position and orientation of the boundary 255 in response to the user interacting with the device 100 to cause a position measurement, or the position can be recorded automatically and without the user's intervention. Additionally, the device 100 can record position data as it moves through the space 250, regardless of whether the device 100 is at rest at a portion of the boundary 255.

The estimated motion of the device 100 (path 261') between times t1 and t2 is very similar to the actual motion of the device 100 (path 261). However, there is a discrepancy in the actual and estimated motion of the device 100 between the times t2 and t3. As shown, the measured motion of the device 100 has a component in the y direction that is different than the actual motion. As a result, at the time t3, the measured position of the device 100 is displaced in the y direction from the actual position of the device 100 by a distance d. In this example, the measured motion of the device 100 has the same component in the x direction as the actual motion of the device; thus, the measured and actual position of the device 100 at the time t3 is not displaced in the x direction. Because the inertial navigation unit of the device 100 measures relative motion, the discrepancy between the measured and actual motion of the device 100 between the times t2 and t3 propagates through to the subsequently measured positions (the positions measured at the later times of t4 to t10).

The error in the measured motion of the device 100 between the times t2 and t3 leads to errors in the diagram 260 (FIG. 2B) that is generated from the measured data. In particular, because of the error in the y component of the measured motion of the device 100, the estimated lengths 256b' and 256h' of the respective walls 256b and 256h are incorrect. In this example, the length 256b' is a distance d shorter than the actual length of the wall 256b, and the length 256h' is the distance d shorter than the actual length of the wall 256h, because these two walls are displaced by the error distance d on only one end of the wall. The estimated lengths 256d' and 256f are accurate, although the measured location of these walls is displaced by the error distance d in the y direction. As a result of these errors, the measured shape 258' of the chimneybreast 258 is inaccurate.

Figure 3:
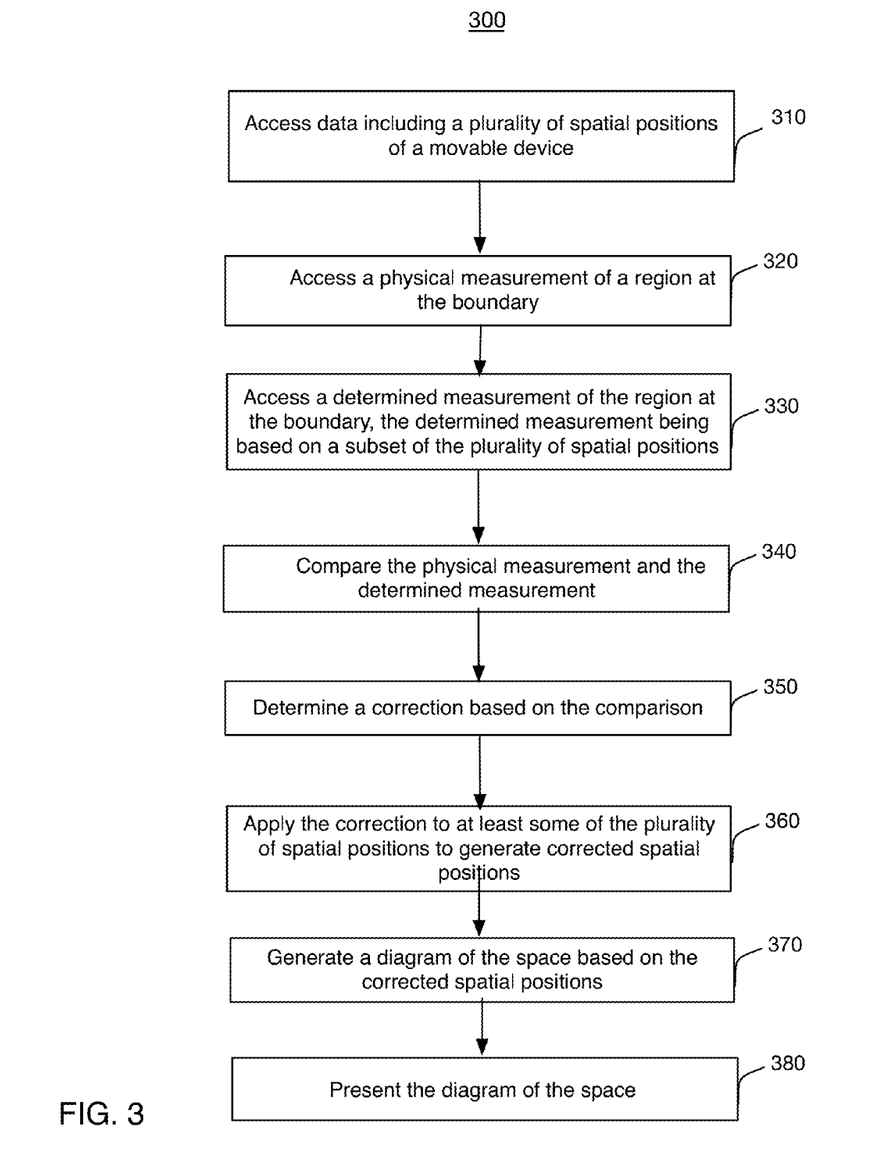
FIG. 3 is a flow chart of an exemplary process for generating a diagram of a space that is at least partially enclosed by a physical boundary.

Referring also to FIG. 3, a flow chart of an exemplary process 300 is shown. The process 300 is used to generate a corrected diagram of a space that is at least partially enclosed by a boundary. The process 300 can be performed on the device 100, and the process 300 is discussed with respect to the space 250 and diagram 260 of FIGS. 2A and 2B.

The process 300 provides a technique that allows a user or the device 100 to provide one or more physical measurements of the boundary 255 to correct and/or enhance the accuracy of the measured spatial data from which the diagram 260 is produced. By providing the physical measurement(s), the measured spatial data is corrected and a diagram 460 (FIG. 4), which is based on the corrected spatial data, more accurately represents the actual shape of the boundary. As discussed with respect to FIG. 3, the process 300 uses the physical measurements to adjust the spatial data collected by the device 100, relieving the user from having to perform manual editing directly on the diagram 260.

Data that includes a plurality of spatial positions of a mobile device is accessed (310). The spatial positions can be the positions measured as the device 100 moved through the space 250. For example, the spatial positions can be a collection of wall touches, each measured by holding the device 100 against a wall that defines part of the boundary 255. The data can be accessed from, for example, the electronic storage 120 of the device 100.

In some implementations, the accessed data has been corrected for positioning errors after being collected by the device 100 and prior to being accessed. For example, the accessed data can be corrected for global positioning error that accumulated when the data was originally recorded. An example of correcting for global positioning error is estimating the location of the same object or point (such as a corner in a room) twice, once at the beginning of a trip through the space 250 and again at the end of the trip through the space 250. The position error accumulated during the measurement can be determined by comparing these two estimated locations of the same corner. In implementations in which the accessed data is pre-corrected for such a position error, the correction can be removed from the access data prior to proceeding with the process 300. As discussed below, the correction can be reapplied to certain corrected data points after the process 300 is performed.

A physical measurement of a region at the boundary 255 is accessed (320). The physical measurement of a region at the boundary 255 can be a measurement of a length of a particular wall entered into the device 100 by the user. The physical measurement can be entered into the device 100 through a graphical user interface that is displayed on the output 110. In some implementations, the user enters the physical measurement by the user selecting a portion (such as a wall) of a displayed diagram and being prompted for the measurement in response to the selection of the portion. The measurement can be obtained from, for example, a tape measure, ruler, or any other measuring apparatus. Continuing with the example of FIG. 2A, the user may enter the length of the wall 256b along the direction y as the physical measurement.

Alternatively or additionally, the measurement can be obtained from a measuring device and provided to the device 100 without the user's input or other interaction. For example, the measurement can be obtained from a laser measure that communicates with the device 100 wirelessly (for example, through a Bluetooth connection) or from a laser measure that is integral with the device 100. In this implementation, the user can select a portion of a displayed diagram, but, instead of being prompted for the measurement, the user is prompted to use the laser measure to measure the wall directly. Other measuring devices, such as a sonic measurement device, that measure a length of a wall without the user having to manually enter the measurement into the device 100 can be used. The procedure 300 continues as if the user had manually entered the measurement, for example, by typing the measurement directly into the device 100.

In some examples, the user may enter a measurement of more than one portion of the boundary 255 into the device 100, or the device 100 can measure more than one portion of the boundary 255 with or without user intervention. For example, lengths of two of the walls 256a-256h can be entered. An example of using more than one physical measurement is shown and discussed with respect to FIGS. 5A and 5B.

A determined measurement of the region of the boundary is accessed (330). The determined measurement can be an estimated length of a portion of the boundary 255. In this example, the determined measurement is the determined length 256b' of the wall 256b, which is determined by the component of motion of the device 100 in the y direction between times t2 and t4. Because of the inaccuracy in measuring the motion between the times t2 and t3, the length 256b' of the wall 256b is erroneously determined to be the distance d shorter than its actual length.

The physical measurement of the length of the wall 256b is compared to the determined length 256b' of the wall 256b (340). A correction is determined based on the comparison (350). The comparison can be a subtraction of the determined measurement from the physical measurement, and the correction can be determined from the subtraction. Continuing the example above, the difference between the determined measurement 256b' and the actual measurement of the wall 256b is the distance d in the y direction. The determined correction can be the distance d in the y direction.

The determined correction is applied to at least some of the positions measured by the device 100 (360). The determined correction is applied to a subset of the positions. For example, the determined correction can be applied to the all of the positions that are after or during the motion discrepancy. Continuing the example above, all of the positions beginning with the position measured at time t3 and ending with the position measured at the time t10 can be corrected by moving the measured position a distance d in the y direction. Positions that occurred before the motion discrepancy are not corrected.

As discussed above, in some implementations, the accessed data (310) can be pre-corrected for global position errors. In these implementations, the correction can be removed from the accessed data prior to applying the correction that is based on a physical measurement. This removal allows the correction that is based on the physical measurement to be more accurate. After the data is corrected based on the physical measurement, the correction for the global position error can be reapplied, but, because the correction based on the physical measurement tends to be very accurate, the correction for the global position error is only applied to data that is not corrected based on the physical measurement. In other words, the global position error is applied to the whole of the motion except for the portion that has received a correction based on the physical correction. Thus, continuing the example above, the global position error correction is not applied the positions measured between t2 and t4. Additionally, although a global position error determined from measuring the same point twice is used as an example, any other technique of determining a position error can also be removed from the initial accessed data and then reapplied to the position data that is not corrected with a physical measurement.

Figure 4:
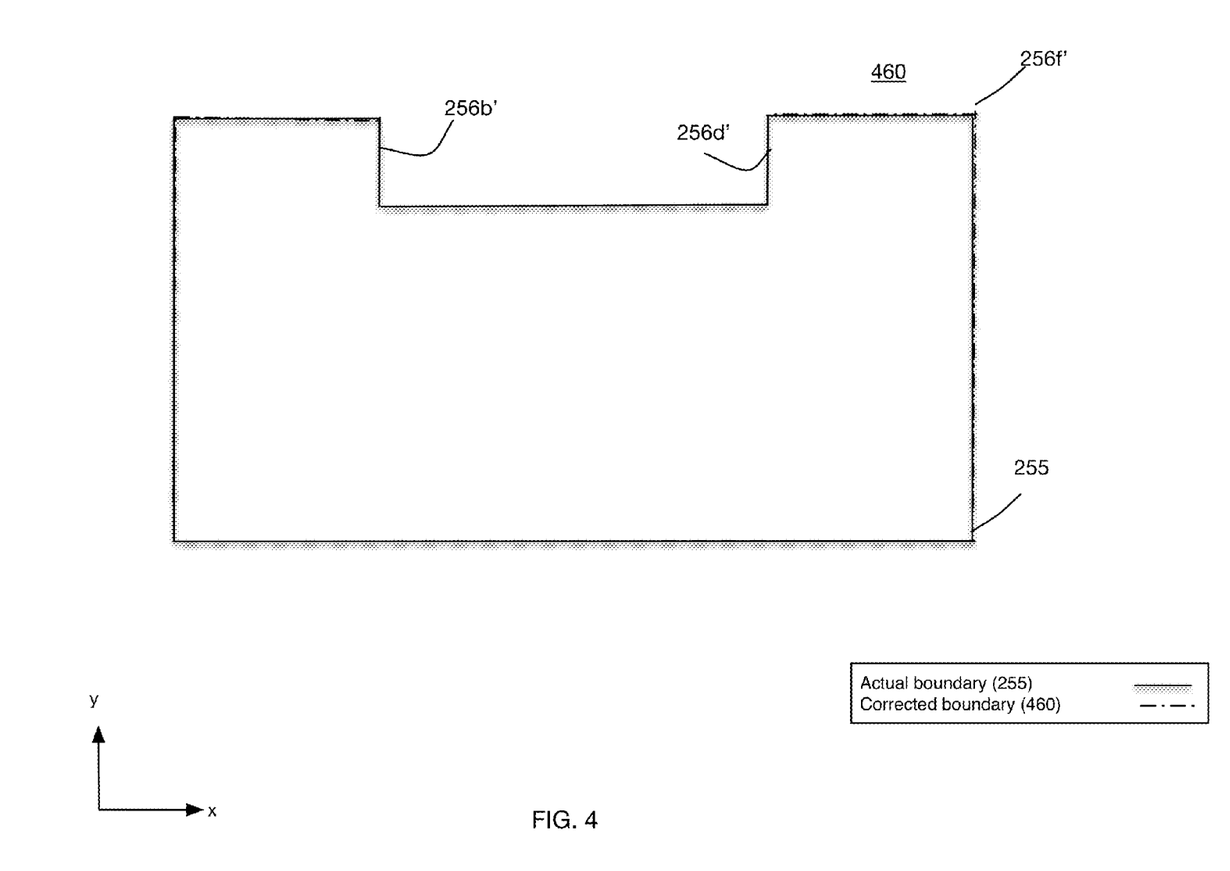
FIG. 4 is a schematic of an exemplary diagram of the space of FIG. 2B generated based on corrected positions.

Referring also to FIG. 4, a diagram 460 of the space 250 is generated based on the corrected spatial positions (370). The diagram 460 can also be based on the spatial positions that did not require correction (such as the position measured at time t1). Because the positions measured between the times t3 and t10 have been moved a distance d in the y direction, the determined lengths of the walls 256b' and 256d' are now the same, and the determined shape of the chimneybreast 258 is consistent with its actual shape.

The diagram 460 can be presented to the user on the output 110 of the device 100 by being shown, for example, visually on a display of the device 100. Additionally, in some implementations, the user has the option to continue to enter physical measurements (such as lengths of walls that define the space 250) and continue with additional iterations of the process 300.

Figure 5A:
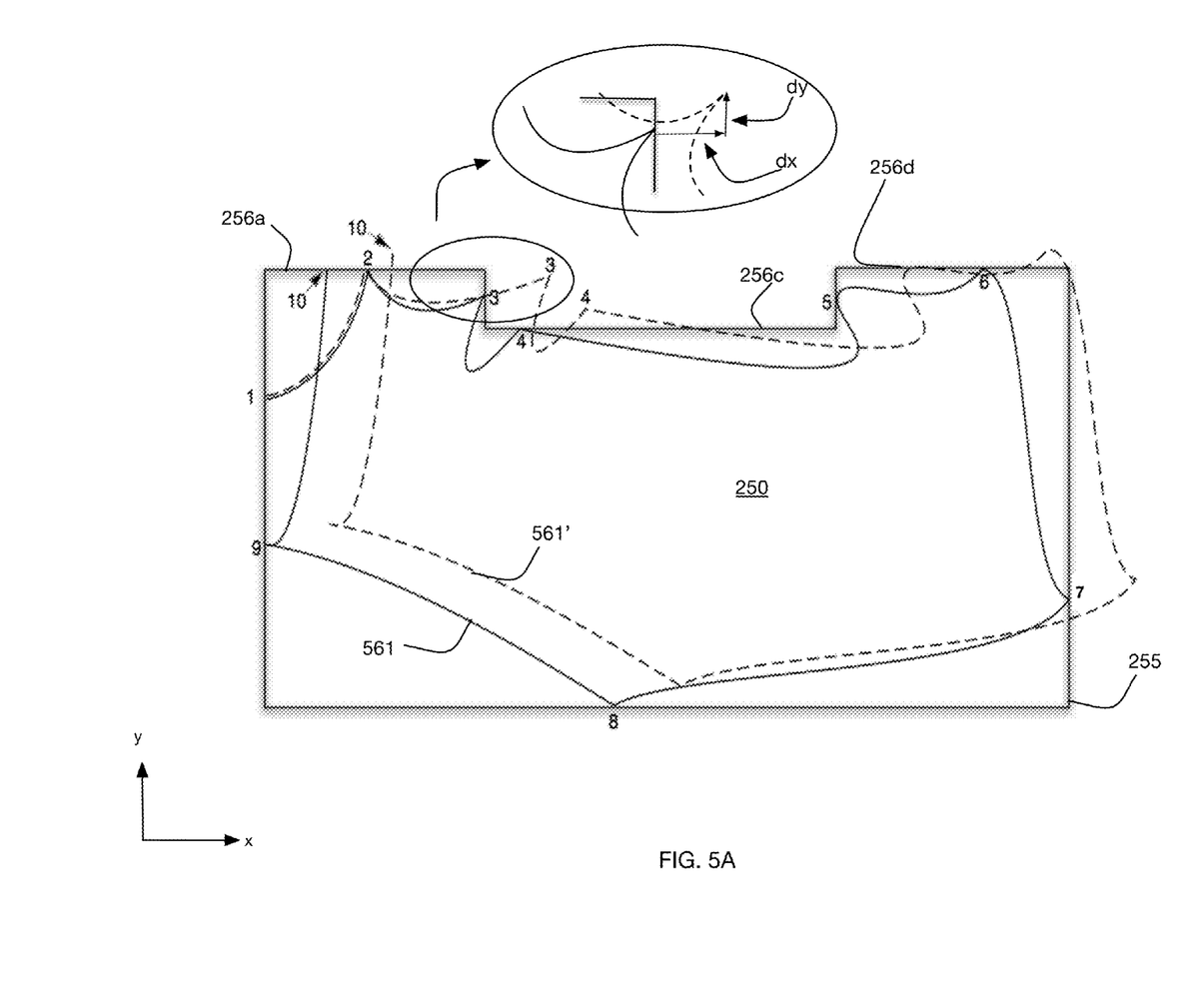
FIG. 5A is a schematic of another exemplary modeled actual and measured path of a device that moves in the space of FIG. 2A.
Figure 5B:
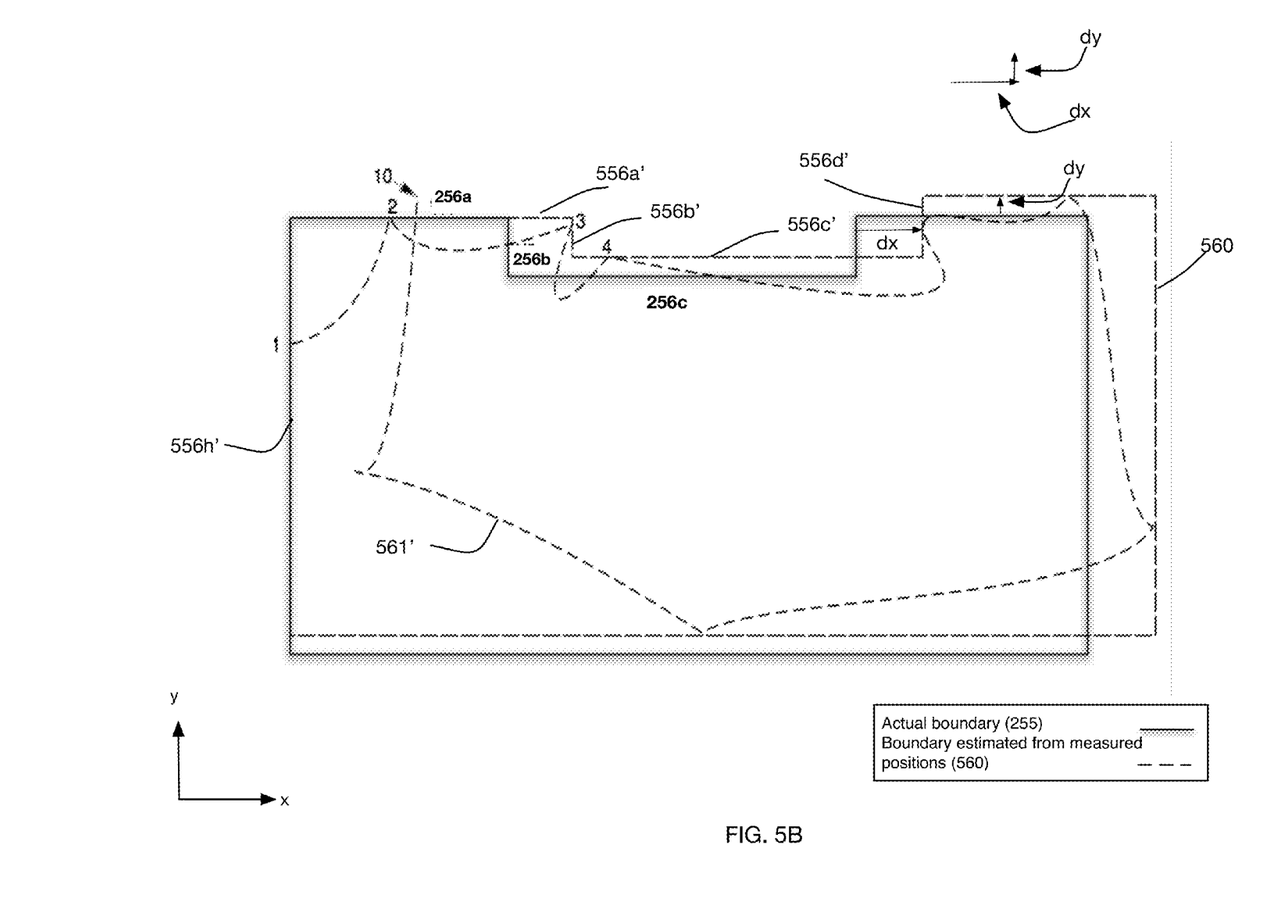
FIG. 5B is a schematic of an actual boundary of a space and a boundary estimated from measured positions.

Referring to FIGS. 5A and 5B, another schematic of the space 250 enclosed by the boundary 255 is shown. The example of FIGS. 5A and 5B is similar to the example of FIGS. 2A and 2B, except the example of FIGS. 5A and 5B show a position error that has components in the x and y directions. Additionally, the correction applied to the data shown in FIG. 5A includes a physical measurement of two of the walls 256a-256h that make up the boundary 255.

FIG. 5A shows a path 561, which is an actual path taken by a user while holding the device 100. FIGS. 5A and 5B show a path 561', which is an estimated path that is reconstructed or otherwise determined from position data collected by the device 100 as it moves through the path 561. In the example shown, the position data are derived from wall touches 1-10 collected by the device 100. At each of the wall touches 1-10, the device 100 measures a position and orientation while the device 100 is motionless. Each of the wall touches 1-10 occurs at a different time, with the touch 1 occurring first and the touch 10 occurring last.

The position data measured at the wall touches 1-10 are used to determine the path 561'. Due to inaccuracies in estimating the motion of the device 100, the paths 561 and 561' are not the same. In the example of FIG. 5A, the motion of the device 100 between touches 1 and 2 is accurately reconstructed, but there is an error in the reconstructed motion between touches 2 and 3. The error has a component of length dx in the x direction and of length dy in the y direction.

FIG. 5B shows an exemplary diagram 560, which represents an estimate of the boundary 255 derived from the position data from the wall touches 1-10 that produced the estimated path 561'. Due to the discrepancy between the paths 561 and 561', the diagram 560 does not overlap with the boundary 255 and the estimated lengths and/or positions of some of the walls 256a-256h are inaccurate. In this example, because of the position error in the x direction, the estimated length 556a' of the wall 256a is dx longer in the x direction than the actual wall 256a. The position error in the y direction results in the estimated length 556b' of the wall 256b being dy shorter than the actual length of the wall 256b in the y direction. The estimated lengths 556c' and 556d' of the walls 256c and 256d are correct, but the estimated locations of these walls are displaced from the actual location by the distance dy in the y direction and the distance dx in the x direction.

The procedure 300 can be used to correct the position data from the wall touches 1-10 that is used generate the path 561'. For example, and referring to FIG. 3, the physical measurement from which a correction is determined can be measured lengths of the walls 256a and 256b. The measured length of the wall 256a is compared to the estimated length 556a' of the wall 256a, and the measured length of the wall 256b' is compared to the estimated length 556b'. The respective differences between the measured and estimated lengths generate two corrections, one in the x direction and the other in the y direction. In this example, the x and y directions are orthogonal. Thus, the corrections in the x and y directions are independent and do not interfere with each other. The correction in the x direction can be the length dx and the correction in the y direction can be the length dy. These corrections can applied to other position measurements that form the estimated path 561' to generate corrected position data and a corrected diagram with the procedure 300 (FIG. 3, 360-370).

Other implementations are within the scope of the claims. For example, the accessed data (FIG. 3, 310) can be a collection of points that represent spatial locations on the boundary that are collected in a manner other than by a wall touch, such as data collected while the device 100 is in motion.

The example discussed with respect to the process 300 is an example in which the measurement error occurs in one direction, the y direction. However, in other examples, the measurement error can have components in the x and y directions. Additionally, the correction is not limited to a direction that is parallel to either the x or y directions.

What is claimed is:

1. A computer-implemented method for generating a diagram of a space that is at least partially enclosed by a physical boundary, the method comprising:
   accessing data comprising a plurality of spatial positions of a device that moves through the space, at least some of the plurality of spatial positions being positions along the boundary and at least some of the plurality of spatial positions representing a location of the movable device when the movable device is stationary;
   accessing a physical measurement of a region at the boundary;
   accessing a determined measurement of the region at the boundary, the determined measurement being based on a subset of the plurality of spatial positions;
   comparing the physical measurement and the determined measurement;
   determining a correction based on the comparison;
   applying the correction to at least some of the plurality of spatial positions to generate corrected spatial positions;
   generating a diagram of the space based on the corrected spatial positions; and
   presenting the diagram of the space.

2. The computer-implemented method of claim 1, wherein the correction is applied to spatial positions measured after the subset of the plurality of spatial positions.

3. The computer-implemented method of claim 1, wherein the data comprises data that describes a measured motion of the movable device in the space.

4. The computer-implemented method of claim 1, wherein each of the plurality of spatial positions represents a location of the movable device in at least two dimensions.

5. The computer-implemented method of claim 1, wherein each of the plurality of spatial positions is measured by the movable device at a different time.

6. The computer-implemented method of claim 1, wherein:
   the boundary comprises walls,
   the space comprises a space that is at least partially enclosed by the walls, and
   the diagram comprises a floor plan.

7. The computer-implemented method of claim 1, wherein accessing a physical measurement of a region at the boundary comprises:
   receiving a measurement of a physical distance of a portion of the boundary.

8. The computer-implemented method of claim 7, wherein receiving a measurement of the physical distance of a portion of the boundary comprises receiving a measurement of a wall that forms part of the boundary.

9. The computer-implemented method of claim 1, wherein presenting the corrected diagram comprises visually presenting the corrected diagram on the movable device.

10. The computer-implemented method of claim 1, wherein each of the plurality of spatial positions is a location of the movable device when the movable device is stationary.

11. The computer-implemented method of claim 10, wherein each of the plurality of locations comprises an orientation of the mobile device.

12. The computer-implemented method of claim 1, wherein the space comprises a room, the boundary comprises walls that meet at corners, and further comprising determining a location of the corners.

13. The computer-implemented method of claim 12, wherein accessing a determined measurement of the region at the boundary comprises determining a distance between the determined locations of two of the corners in one dimension.

14. The computer-implemented method of claim 1, wherein accessing a physical measurement of a region at the boundary comprises accessing a plurality of physical measurements, each of a different region at the boundary.

15. The computer-implemented method of claim 14, wherein at least two of the plurality of physical measurements are taken along directions that are orthogonal to each other.

16. A movable device for generating a diagram of a space that is at least partially enclosed by a physical boundary, the device comprising:
   a housing configured to be carried by a user;
   a motion sensor; and
   one or more electronic processors and a non-transitory computer-readable medium comprising instructions that, when executed, cause the one or more electronic processors to:

access data comprising a plurality of spatial positions of the device, at least some of the plurality of spatial positions being positions along the boundary and at least some of the spatial positions being obtained when the device is stationary;

access a physical measurement of a region at the boundary;

access a determined measurement of the region at the boundary, the determined measurement being based on a subset of the plurality of spatial positions;

compare the physical measurement and the determined measurement;

determine a correction based on the comparison;

apply the correction to at least some of the plurality of spatial positions to generate corrected spatial positions;

generate a diagram of the space based on the corrected spatial positions; and present the diagram of the space.

17. The device of claim 16, wherein the instructions to cause the one or more processors to access the physical measurement comprise instructions to cause the one or more processors to:

present an graphical interface to the user, the graphical interface configured to allow the user to enter the physical measurement.

18. The device of claim 16, wherein the device comprises a measurement sensor, and the instructions to access the physical measurement comprise instructions to access a measurement obtained by the measurement sensor.

19. The device of claim 16, wherein the measurement sensor measures a length of a portion of the boundary without user intervention.

20. The device of claim 16, wherein the measurement sensor comprises a laser measure.

* * * * *